(12) United States Patent
Arai

(10) Patent No.: US 6,282,316 B1
(45) Date of Patent: *Aug. 28, 2001

(54) IMAGE PROCESSING METHOD AND APPARATUS THAT USE HANDWRITTEN GESTURES FOR EDITING

(75) Inventor: Tsunekazu Arai, Tama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,044

(22) Filed: Jul. 3, 1997

(30) Foreign Application Priority Data

Jul. 5, 1996 (JP) .................................................. 8-194101

(51) Int. Cl.⁷ .............................. G06K 9/00; G06K 9/03; G06F 3/00
(52) U.S. Cl. ......................... 382/187; 382/311; 345/358
(58) Field of Search .................................. 382/182, 187, 382/309, 311, 177, 178; 178/18.02; 345/358

(56) References Cited

U.S. PATENT DOCUMENTS

| | | | |
|---|---|---|---|
| 4,972,469 | * 11/1990 | Sklarew | 382/13 |
| 5,034,991 | * 7/1991 | Hagimae et al. | 382/30 |
| 5,414,228 | * 5/1995 | Yamashita | 178/18 |
| 5,448,475 | * 9/1995 | Senoo et al. | 364/419.1 |
| 5,500,937 | * 3/1996 | Thompson-Rohrlich | 395/161 |
| 5,517,578 | * 5/1996 | Altman et al. | 382/181 |
| 5,523,775 | * 6/1996 | Capps | 345/179 |
| 5,583,543 | * 12/1996 | Takahashi et al. | 345/173 |
| 5,717,939 | * 2/1998 | Bricklin et al. | 395/764 |
| 5,745,719 | * 4/1998 | Falcon | 395/358 |
| 5,761,340 | * 6/1998 | Suzuki | 382/189 |
| 5,781,663 | * 7/1998 | Sakaguchi et al. | 382/189 |
| 5,828,783 | * 10/1998 | Ishigaki | 382/186 |
| 5,867,150 | * 2/1999 | Bricklin et al. | 345/172 |
| 6,088,481 | * 7/2000 | Okamoto | 382/189 |

OTHER PUBLICATIONS

Foley, Computer Graphics: Practice and Principles, Addison–Wesley Publishing, p. 38, 1996.*

"Handwriting recognition in the GO operating system",by Carr, R.M., Digest of Papers Compcon Spring '91, pp. 483–486, Mar. 3, 1991.*

* cited by examiner

Primary Examiner—Amela M. Au
Assistant Examiner—Martin Miller
(74) Attorney, Agent, or Firm—Fitzpatrick, Cella, Harper & Scinto

(57) ABSTRACT

According to the invention, it is possible to a void the inconvenience of repetitively inputing the same character; a desired character can be repetitively outputted by a simple operation. Particularly, in a case of inputting a character group by means of a handwriting character recognition unit, each time characters such as "0 (zero)" and "O (oh)" or the like having similar shapes are repetitively inputted, an operation to select a desired character from "0 (zero)" and "O (oh)" is always needed, so that operability is very poor. When a complicated figure or image is inputted, an operation to repetitively input such figure or image is troublesome. In consideration of such a case, according to the invention, by merely selecting an image which has already been inputted and writing a gesture of a predetermined shape over the width in which the image is to be repetitively outputted, by outputting a specified image to a gesture input position by only a length corresponding to a gesture width, a repetitive output of the same image can be easily and reliably realized.

42 Claims, 12 Drawing Sheets

FIG. 3

| | | |
|---|---|---|
| PRINCIPAL | 1850 | ～31 |
| INTEREST | 0.0606 | ～32 |
| TERM OF PAYMENT | 8 | ～33 |
| NO. OF PAYMENTS | 12 | ～34 |
| DATE OF START | 93.5.1 | ～35 |
| NO. OF MONTHS | | |
| SUM OF PAYMENT | | |
| TOTAL SUM | | |

(ST1 marker at PRINCIPAL field; reference 102)

FIG. 4

| | |
|---|---|
| PRINCIPAL | 18500000 |
| INTEREST | 0.0606 |
| TERM OF PAYMENT | 8 |
| NO. OF PAYMENTS | 12 |
| DATE OF START | 93.5.1 |
| NO. OF MONTHS | |
| SUM OF PAYMENT | |
| TOTAL SUM | |

IMAGE PROCESSING METHOD AND APPARATUS THAT USE HANDWRITTEN GESTURES FOR EDITING

BACKGROUND OF THE INVENTION

1. Field of the Invention

The invention relates to image processing method and apparatus for recognizing a handwriting image and editing an image.

2. Related Background Art

A conventional handwriting character recognizing apparatus is constructed by means for inputting a handwriting stroke pattern of a handwriting character, a dictionary in which handwriting character patterns that have previously been registered and character codes according to those patterns have been stored, and means for collating the input pattern and the dictionary pattern, and one character code is ordinarily made to correspond to one pattern.

A handwriting character recognizing apparatus having means for allowing the user to register a certain handwriting pattern and one or a plurality of character codes into a user registration dictionary in addition to the above means also exists.

However, according to the conventional handwriting character recognizing apparatus, in a case of inputting "1000 (thousand)", a handwriting pattern of 1 (one), a handwriting pattern of 0 (zero), a handwriting pattern of 0 (zero), and a handwriting pattern of 0 (zero) have to be inputted. In a case of inputting numerical values, although there are many cases of continuously inputting the same numeral, the same numeral has to be inputted by handwriting every time in the above conventional apparatus.

Further, a case where a recognition result is erroneous occurs, and there is a case where even when the user ought to have written the same character, if the handwriting patterns are only slightly different, "1000 (one, zero, zero, zero)" is erroneously recognized as "1000 (one, zero, oh, zero)" or the like, which is troublesome to correct.

In a case of a handwriting character recognizing apparatus having user pattern registering unit, a handwriting pattern A can be registered for "000 (zero, zero, zero)" and a handwriting pattern B can be registered for "000 (zero, oh, zero)". However, make provision for various scenes, it is necessary to register many handwriting patterns. It is extremely troublesome to register many handwriting patterns and to separately use them. Moreover, when many patterns are registered, a problem of an erroneous recognition also occurs, so that such a method is not so practical at the time of the actual use.

SUMMARY OF THE INVENTION

In consideration of the problems of the foregoing prior arts, it is an object of the invention to easily and certainly execute an operation for continuously inputting a plurality of same characters.

In consideration of the problems of the foregoing prior art, it is another object of the invention to enable an operation for repetitively inputting an image which has been inputted to be easily executed.

BRIEF DESCRIPTION OF THE DRAWINGS

FIG. 3 is a diagram showing a picture plane when a repetitive gesture is being inputted in the first embodiment;

FIG. 4 is a diagram showing a picture plane of a result in which a gesture recognizing process was performed in the first embodiment;

DETAILED DESCRIPTION OF THE PREFERRED EMBODIMENTS

Embodiments of the present invention will now be described hereinbelow with reference to the drawings.

[Embodiment 1]

Figure 1:
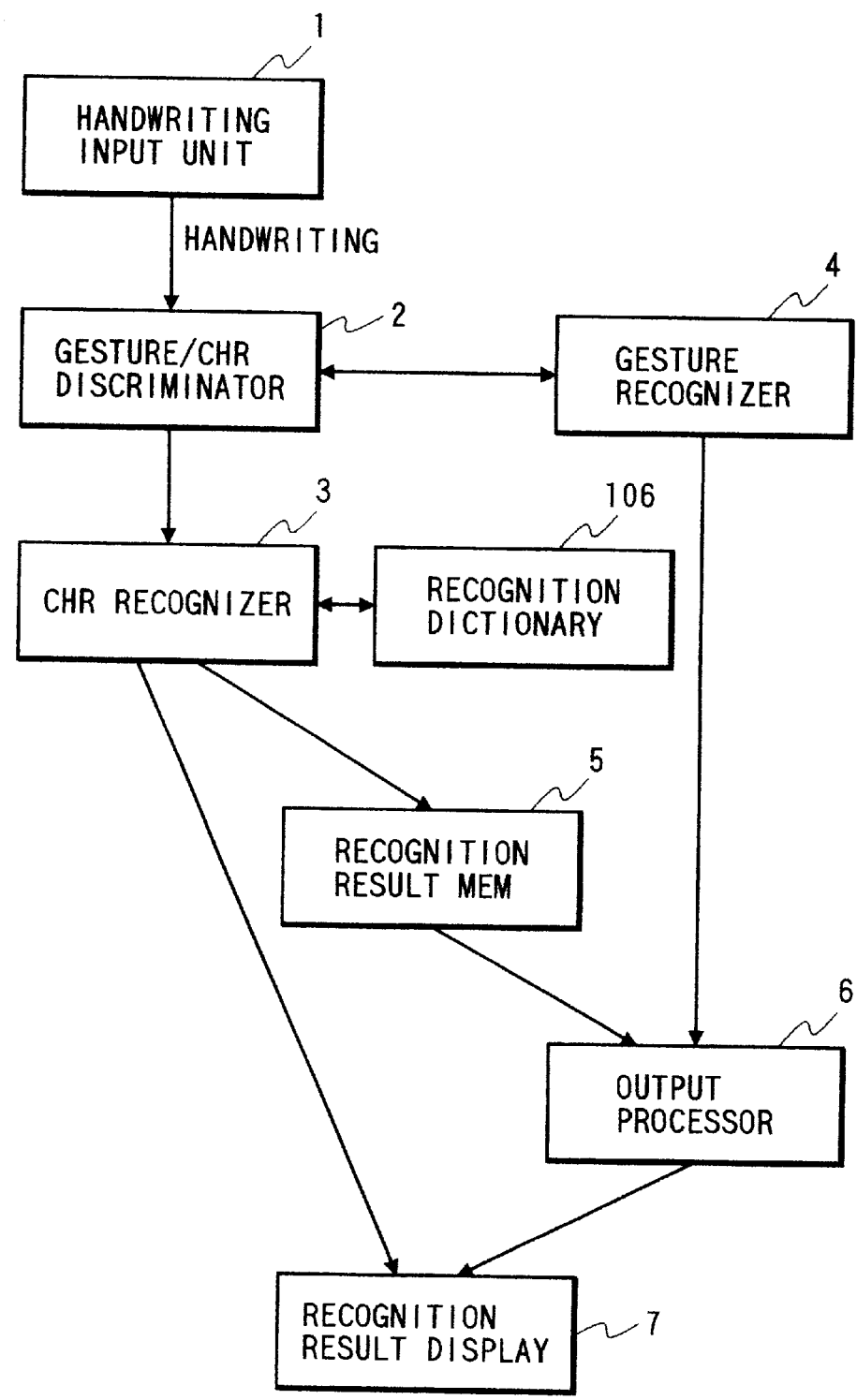
FIG. 1 is a functional block diagram showing a construction of a main functional portion of a handwriting character recognizing apparatus according to the first embodiment of the invention.

FIG. 1 is a functional block diagram showing a construction of a main functional portion of a handwriting character recognizing apparatus according to the first embodiment of the invention.

In the diagram, reference numeral 1 denotes a handwriting input unit comprising a position coordinate detector or the like for inputting a handwriting character that is written with a pen. Reference numeral 2 denotes a repetition gesture/character discriminator for discriminating whether an input pattern is a gesture or a part of a character from a length of stroke of one handwriting that is sent from the handwriting input unit 1.

Reference numeral 3 denotes a character recognizer for collating with a handwriting character inputted by the handwriting input unit 1 by an algorithm of, for example, a feature point system by using a recognition dictionary 106 in which standard features of writing methods of a plurality of characters which had previously been formed have been stored and for outputting a character code train as a recognition result. Reference numeral 4 denotes a gesture recognizer for determining the number of characters to be repetitively outputted from a length of gesture stroke which is transmitted from the gesture/character discriminator 2.

Reference numeral 5 denotes a recognition result memory to store a recognition result for one character of the character recognizer 3. Reference numeral 6 denotes an output processor of stored characters for transmitting output instructions of the characters corresponding to the character codes stored in the recognition result memory 5 of only the numeral instructed from the gesture recognizer 4 to a recognition result display 7. Reference numeral 7 denotes the recognition result display comprising a display device such as a liquid crystal or the like. Reference numeral 106 denotes the recognition dictionary which is used by the character recognizer 3.

Figure 2:
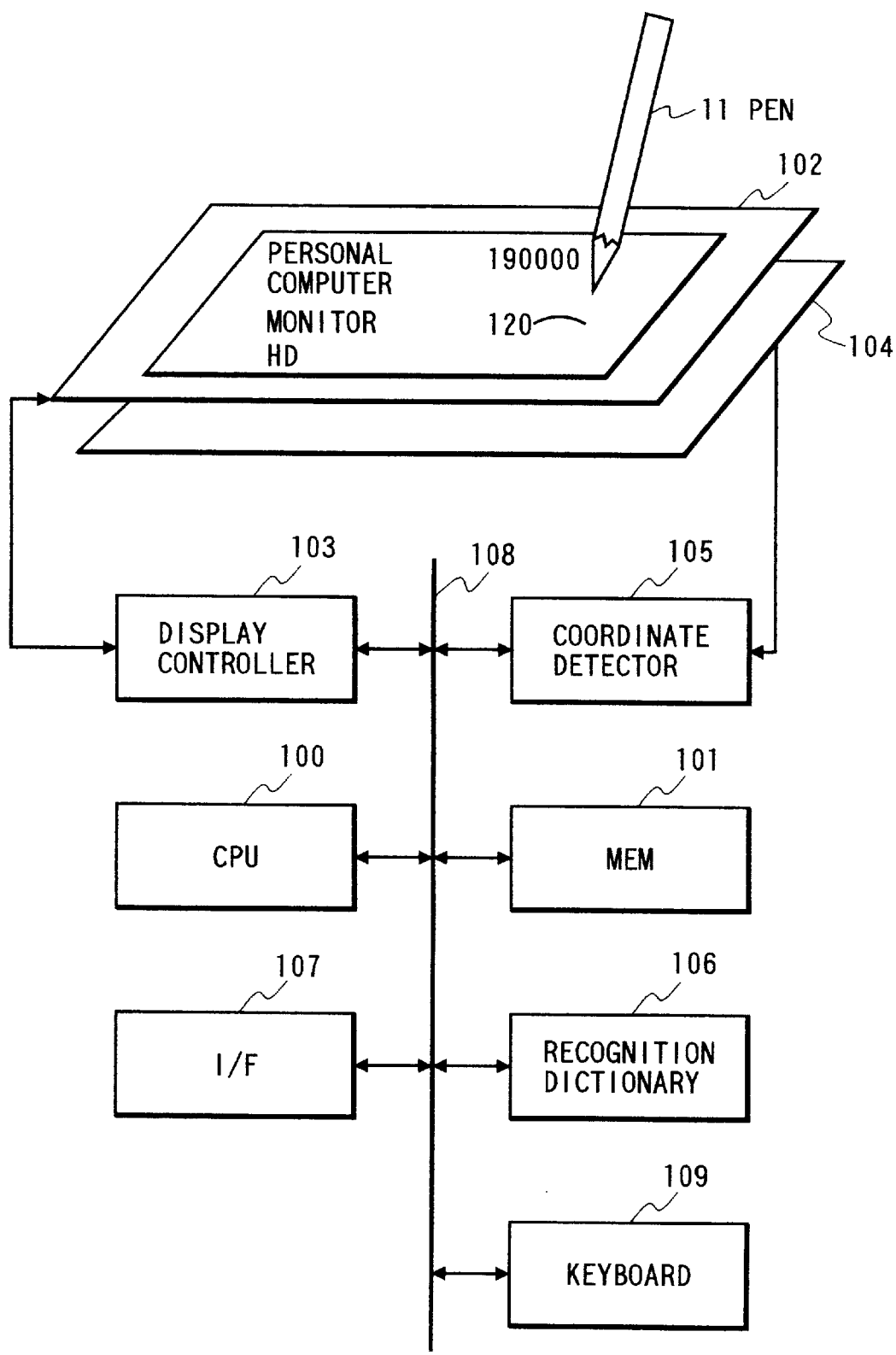
FIG. 2 is a block diagram showing a specific construction of the handwriting character recognizing apparatus of the first embodiment.

FIG. 2 is a diagram showing a specific construction of the handwriting recognizing apparatus of the embodiment.

Reference numeral 100 in the diagram denotes a CPU for controlling the whole apparatus. Reference numeral 101 denotes a memory comprising an ROM in which an operation processing procedure of the CPU 100 (including an operation processing procedure shown by a flowchart of FIG. 5, which will be explained hereinbelow) and character font patterns have been stored and an RAM which is used as a work area. It is also possible to construct in a manner such that a control program of processes according to the invention such as a flowchart or the like, which will be explained herein later, is down-loaded into a writable area in the memory 101 from a storage medium such as a CD-ROM or the like that is detachable for the apparatus main body and the processes are executed. Buffer areas of the number as many as the number of character frames to be inputted are assured in the RAM in the memory 101. Inputted stroke information, character code as a recognition result, and the like are stored into the respective buffer areas.

Furthermore, prior to describing, the handwriting character recognizing apparatus in the embodiment is not limited to an apparatus for merely recognizing and converting a character group but can be also constructed so as to execute an application program such as loan calculation, edition of a document, or the like on the basis of the character as an input result. However, since the feature of the invention doesn't relate to such processes, its description is omitted.

Reference numeral 102 denotes a display by a liquid crystal or the like and 103 indicates a display controller for performing a display control of the display 102 under the control of the CPU 100. The display controller 103 has therein a memory (VRAM) for drawing a character pattern to display, a locus of an inputted stroke, or the like. Reference numeral 104 denotes a transparent coordinate detecting plate locating in front of the display 102 and 105 indicates a coordinate detector for detecting a position instructed by a pen 11 and up/down information of the pen.

Reference numeral 106 denotes the recognition dictionary which is used for character recognition. The recognition dictionary 106 is the same as that shown by 106 in FIG. 1. Reference numeral 107 denotes an interface (I/F) which is used to connect, for example, a printer or an external storage device. Reference numeral 109 denotes a general keyboard for inputting a character code or the like. The above component units are connected through a bus 108.

FIGS. 3 and 4 are diagrams each showing an example of an operation picture plane of the handwriting character recognizing apparatus. FIG. 3 shows the picture plane when a repetitive gesture is being inputted. FIG. 4 shows the picture plane of a result in which a gesture recognizing process has been performed. Although a numerical value input picture plane of the loan calculation has been used as an operation example, since the process of the loan calculation doesn't relate to the feature of the invention, its description is omitted here.

Reference numeral 102 in FIG. 3 denotes a whole output picture plane displayed on the display 102. Reference numerals 31, 32, 33, 34, and 35 in FIG. 3 denote numerical value input areas. When a handwriting numeral is inputted, the numeral is recognized and displayed. When a gesture ST1 of a line-shaped stroke is inputted, a gesture process is executed.

Figure 5:
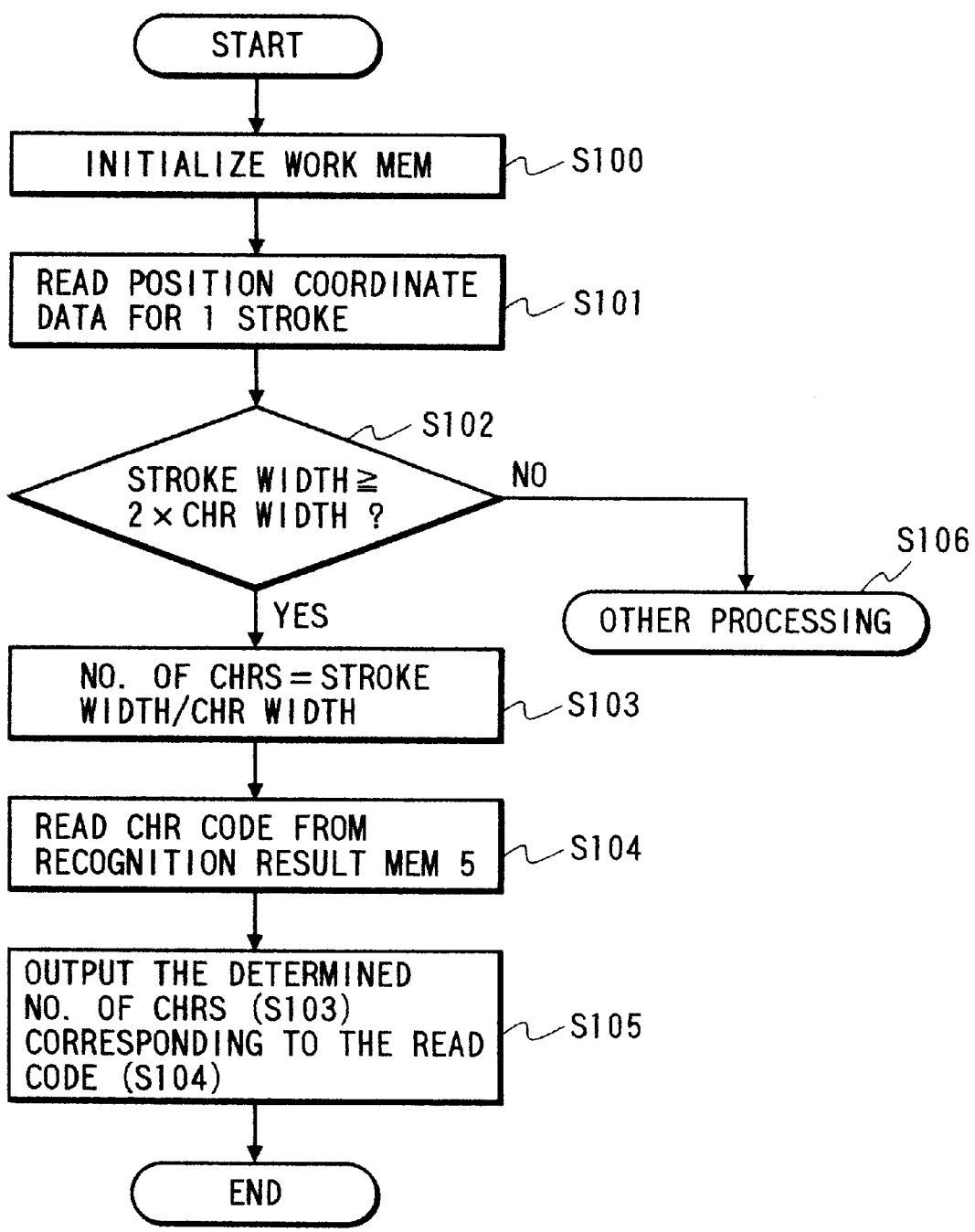
FIG. 5 is a flowchart showing a procedure for a gesture/character discriminating process, a gesture recognizing process, and a repetitive outputting process of a stored character in the first embodiment.

FIG. 5 is a flowchart showing a procedure of a gesture/character discriminating process, a gesture recognizing process, and a repetition output process of a stored character of the handwriting character recognizing apparatus of the embodiment. A program to realize the flowchart has been stored in the memory 101. The process of the character repetition gesture will now be described hereinbelow mainly with reference to the operation picture planes of FIGS. 3 and 4 and the flowchart of FIG. 5.

Step S100 in FIG. 5 relates to the initialization of a work memory. A work memory area such as a buffer or the like of locus data which is used for the gesture recognizing process shown by the flowchart of FIG. 5 is initialized. It is now assumed that a timing to start the processes in the flowchart of FIG. 5 is set to a timing when a pen-up time had elapsed by a certain predetermined time or more or a timing when a processing start instructing region is instructed with the pen.

In step S101, a process to read position coordinate data for one stroke is executed. Since a handwriting locus written on the coordinate detecting plate 104 by the pen 11 is transmitted as position coordinate data of XY from the coordinate detector 105, the position coordinate data for one stroke is read into the work memory area. In step S102, a check is made to see if the stroke which has been read is a gesture stroke or a part of a stroke of a character. When the shape of stroke is a line shape registered in the recognition dictionary 106 and the stroke width is equal to or longer than a width of two characters of the character group width, it is determined in step S102 that the read stroke is a character repetition gesture.

When it is determined in step S102 that the answer={(the maximum×coordinate of the read stroke)−(the lateral width obtained in the minimum×coordinate)}/(the character group width)

is equal to 2 or more, this means that the read stroke is a character repetition gesture. Therefore, the processing routine advances to step S103 and the number obtained in step S102 is held in the memory 101. When it is determined in step S102 that the read stroke is a part of the stroke of the character or another gesture, the data of the stroke is handed to the ordinary character recognizer and gesture process (S106).

The repetition gesture width can be also set to an interval between the start point and the end point of the stroke. During the writing operation of the gesture, by repeating the processes in steps S102 to S105 from the lateral width at that time point, the repetition character can be also displayed in a real-time manner in accordance with the writing of the gesture.

The process in step S102 is executed for all of the strokes inputted and is started at the time of the end of the inputting operation of one character or one gesture. When the processes for all of the strokes are finished, the processing routine is finished. After that, if the read stroke is the character repetition gesture, the processes are executed from step S103. If the read stroke is a handwriting character, a character code train is outputted as a recognition result. In case of the example of the operation picture plane 3, since the lateral width of the line-shaped stroke ST1 written in the input area 31 is equal to or larger than four characters, the processes of the character repetition gesture (S103 to S105) are executed.

In step S103, the number of characters which are repetitively outputted is determined. In order to repetitively display the characters of the number corresponding to the repetition gesture width, a process for setting > the answer={the repetition gesture width (the maximum×coordinate of the stroke−the minimum×coordinate)}/{the character group width (the character font width designated at that time)} into the number of characters and storing into the memory 101 is executed. In the case of the example of the operation picture plane 3, since the stroke width written in the input area 31 is equal to or larger than four characters, the number 4 of repetition characters is stored. A process about whether a fraction (remainder) derived by an arithmetic operational equation to obtain the number of characters is raised to a unit or is omitted or the like can be arbitrarily determined. A value of the denominator in the arithmetic operational equation can be also set to (the character group width+the character interval). The value of the denominator can be also set to a width of an object to be read out in step S104.

In step S104, a process to read out the character code of the character recognition result stored in the recognition result memory 5 in FIG. 1 is executed. Since the character code has been stored in the recognition result memory 5 in FIG. 1 each time the handwriting character is inputted and recognized, if it is read out when the gesture is written, the recognition result of the handwriting character written just before the gesture is inputted is read out. In case of the example of the operation picture plane 3, since the character written just before the repetition gesture written in the input area 31 is equal to "0", the character code of "0" is read out. In step S104, a character at a position adjacent (reverse direction of the end point) of the start point at which the gesture was written can be also read instead of fetching a character written just before with respect to the time.

In step S105, the characters of the character codes read out in step S104 as many as only the determined number are outputted while setting the left end of the position where the stroke of the repetition gesture was written to a start point. In case of the example of the operation picture plane 3, the character code of "0" is read out in step S104 and the stroke width of the repetition gesture is equal to four characters and it is written at a position besides 1850. Therefore, "0" is continuously outputted four times like "0000" to the right lateral side and "18500000" is inputted to the input area 31 as shown in the example of the operation picture plane 4.

As for the object to be read out in step S104 and the object to be outputted in step S105, it is sufficient that both of them are the same object and its kind may be any one of a character pattern, image, figure, and the like.

By executing such processes, when the user wants to continuously input a plurality of same characters, by inputting a repetition gesture of a length which the user wants to repeat, the process for continuously inputting only the desired number of same characters can be easily realized.

According to the embodiment as mentioned above, by providing the repetition gesture recognizer to decide the number of characters to be outputted in accordance with the length of the line-shaped stroke of the gesture which was inputted, in case of continuously inputting the same character, by inputting the gesture of the length corresponding to the number of characters, the same characters of the number decided by the repetition gesture recognizer can be outputted.

[Embodiment 2]

The second embodiment of the invention will now be described.

Figure 6:
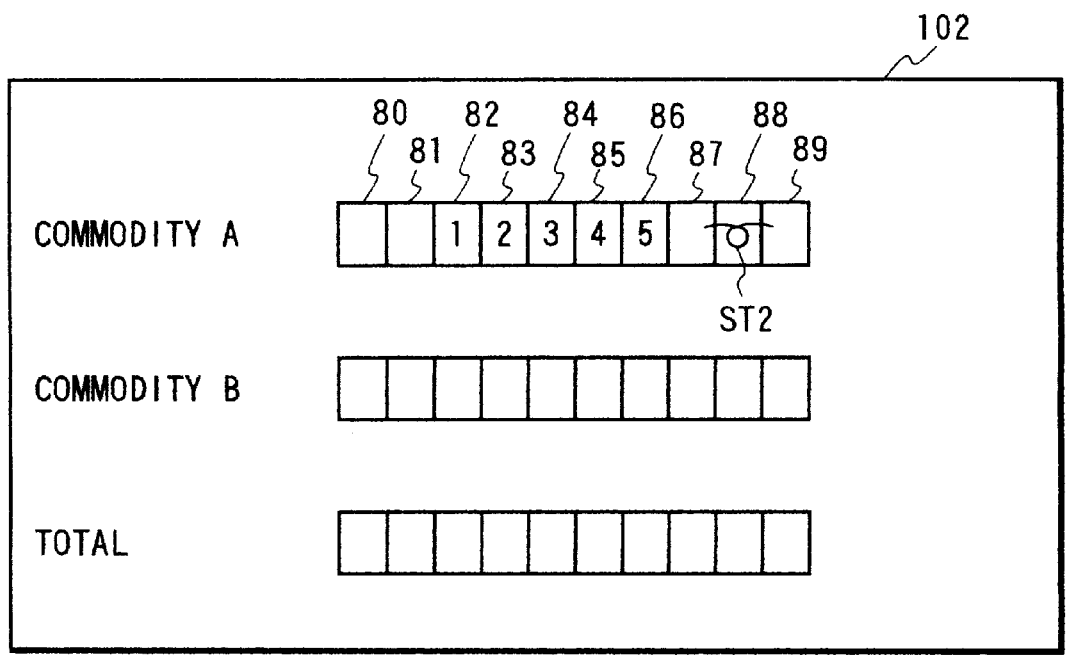
FIG. 6 is a diagram showing an example of an operation picture plane according to the second embodiment.
Figure 7:
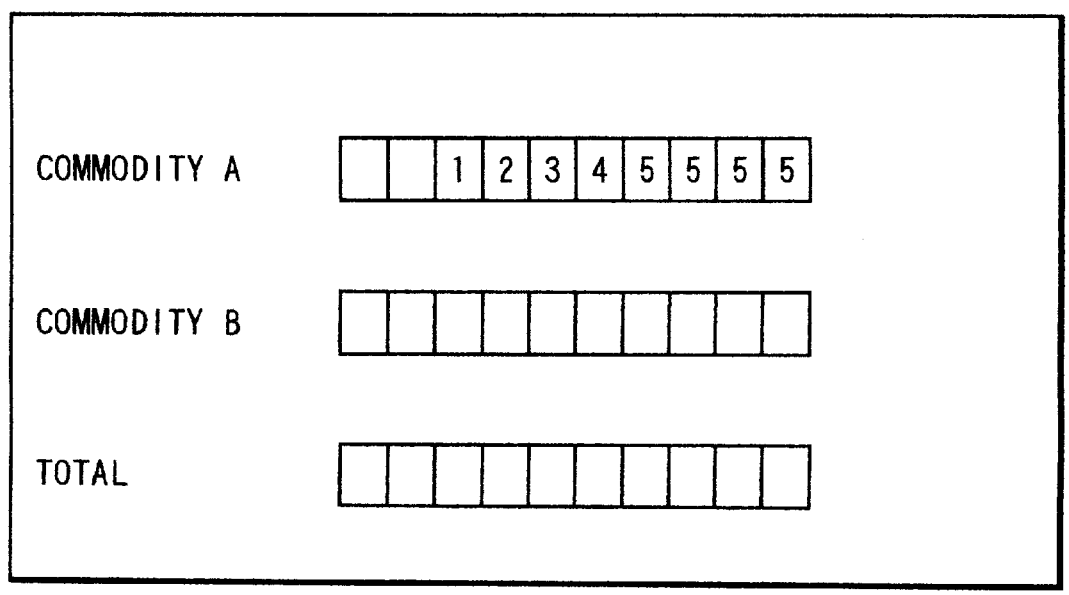
FIG. 7 is a diagram showing an example of an operation picture plane according to the second embodiment.
Figure 8:
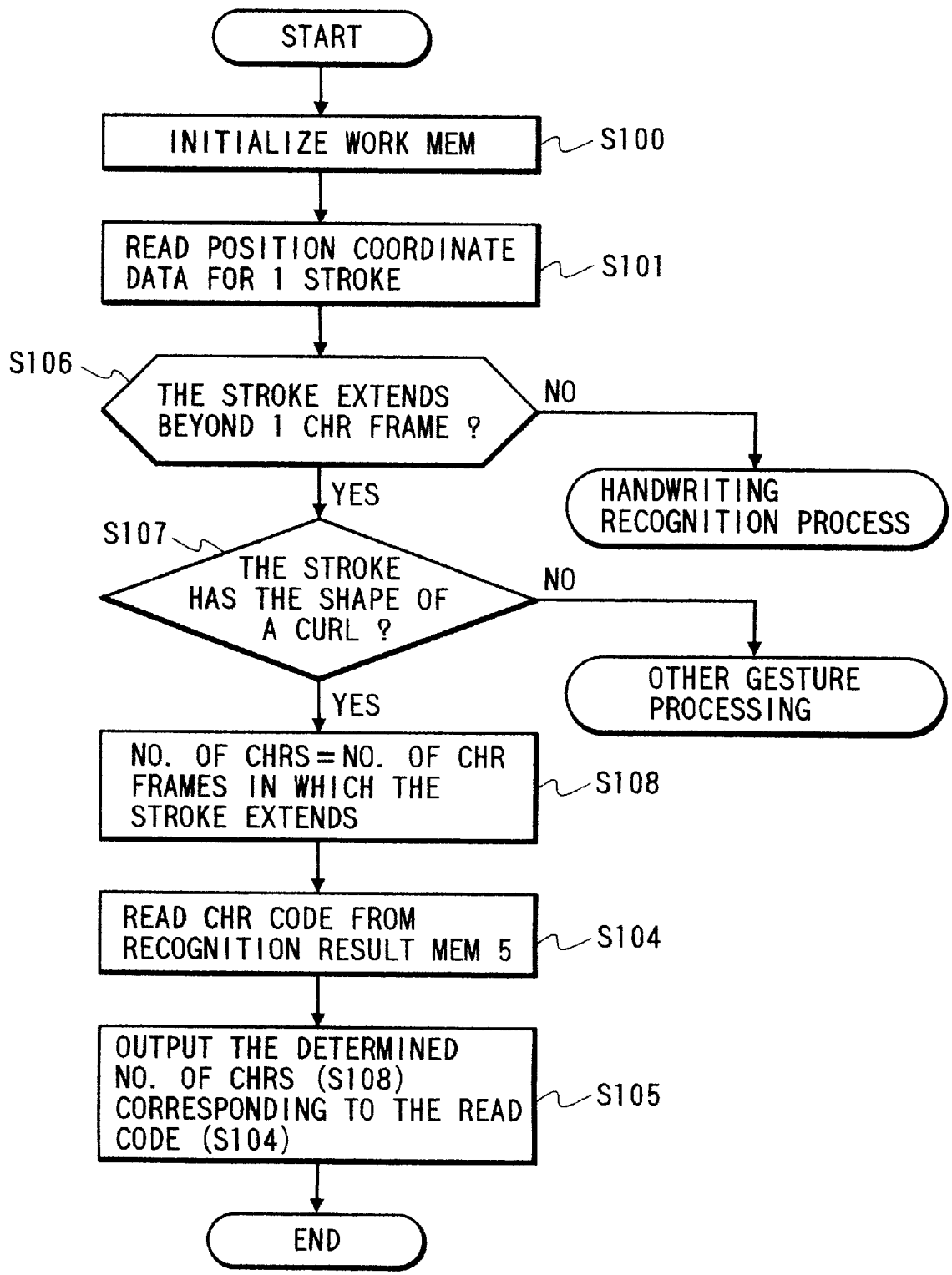
FIG. 8 is a flowchart showing a procedure for a gesture/character discriminating process, a gesture recognizing process, and a repetitive outputting process of a stored character in the second embodiment.

In the above first embodiment, although a character frame of each character doesn't exist in the input area of the handwriting character, the invention can also cope with a case where the character frame exists. In such a case, it is possible to cope with it by changing a part of the flowchart of FIG. 5. FIGS. 6 and 7 show examples of operation picture planes of the second embodiment. Reference numerals 80 to 89 in FIG. 6 denote input character frames. FIG. 8 shows a modified flowchart.

FIG. 8 is a flowchart showing a procedure of a gesture/character discriminating process, a gesture recognizing process, and a repetition output process of a stored character of a handwriting character recognizing apparatus according to the second embodiment of the invention. A program to realize this flowchart has been stored in the memory 101.

In this embodiment, it is assumed that a stroke of shape which extends beyond one character frame and is shown at ST2 in FIG. 6 (hereinafter, this shape is called a curled shape) is a character repetition gesture. Since processes in steps S100 and S101 are the same as those in the flowchart of FIG. 5, their descriptions are omitted here.

In step S106, a gesture stroke and a character stroke are first separated. The number of the character frame where the position coordinate point of the stroke exists is first discriminated. When the stroke lies within one character frame, since this means that it is a character stroke, the stroke data is handed to the recognizing process of the handwriting character. If the stroke lies within two or more character frames, since this means that it is a gesture stroke, the processing routine advances to step S107. Since the curl-shaped stroke ST2 written in the input character frames 87, 88, and 89 in FIG. 6 showing the example of the operation picture plane is written in three character frames, the number of character frames is decided to be equal to or larger than 2, so that the processing routine advances to step S107.

In step S107, a check is made to see if the stroke is a repetition gesture or another gesture. In the embodiment, since the curl-shaped stroke relates to a repetition gesture, a check is made to see if the shape of the input stroke is a curl shape. If they are the same shape, step S108 follows. In case of a shape other than the curl shape (for example, line shape), the stroke data is handed to another gesture process. Since the shape of stroke written in the input character frames 87, 88, and 89 in FIG. 6 showing the example of the operation picture plane is a curl shape, this means that the stroke relates to a repetition gesture. Therefore, the processing routine advances to step S108.

In step S108, the number of repetition characters is determined. The number of character frames of the stroke in which the stroke of the repetition gesture extends corresponds to the number of characters to be repetitively outputted. Since the numbers of the character frames to distinguish the character frames are sequentially allocated from the left as shown in FIG. 6, > {(the number of the character frame at the end point of the gesture stroke)−(the number of the character frame at the start point of the gesture stroke)+1}=(the number of repetition characters).

In the case of the repetition gesture in FIG. 6 showing the example of the operation picture plane, the number of the character frame at the end point is equal to "89" and the number of the character frame at the start point is equal to "87". Therefore, $$89-87+1=3$$

The repetition number is equal to 3.

Since processes in steps S104 and S105 are similar to those in the flowchart of FIG. 5, their descriptions are omitted. After "12345" in the example of FIG. 6 was inputted, the repetition gesture of the curl-shaped stroke is inputted. Since the repetition number is equal to 3, "5" is outputted three times, so that "12345555" is derived as shown in FIG. 7.

When the user wants to continuously input a plurality of same characters by executing the processes as mentioned above, by inputting the repetition gesture of a length which the user wants to repeat, a process for continuously inputting only the desired number of same characters can be easily realized. In the embodiment, since the repetition number is determined by the character frames, there is an advantage such that the repetition number can be clearly instructed.

[Embodiment 3]

The third embodiment of the invention will now be described.

In the first and second embodiments, although the target of the repetitive output of the repetition gesture is one character, an embodiment in which a plurality of continuous characters are used as targets is also considered. In case of the third embodiment, the constructional diagram of the first embodiment is changed as shown in FIG. 9.

Figure 9:
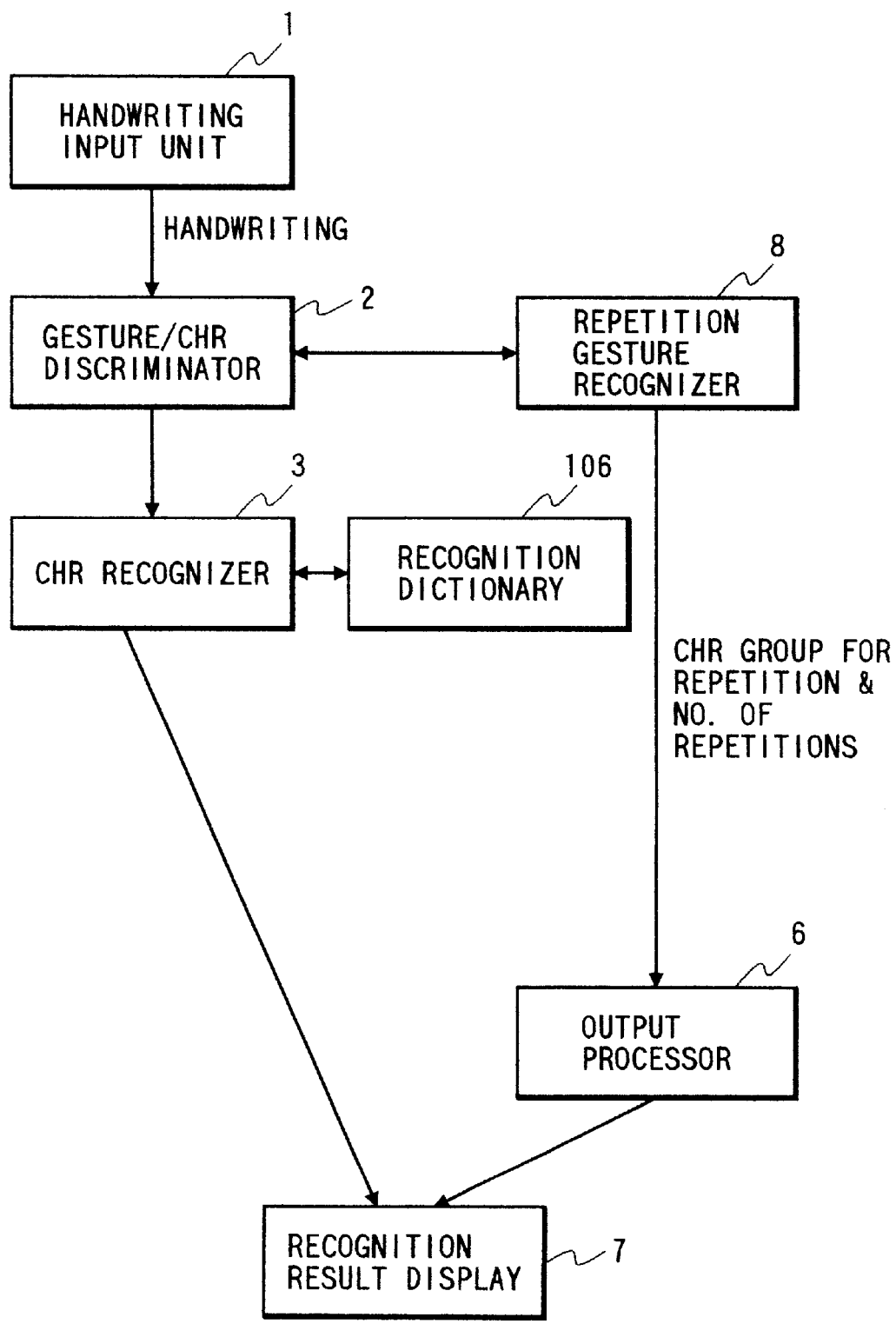
FIG. 9 is a functional block diagram showing a construction of a main functional portion of a handwriting character recognizing apparatus according to the third embodiment.

FIG. 9 is a functional block diagram showing a construction of a main functional portion of a handwriting character recognizing apparatus according to the third embodiment of the invention.

Figure 10:
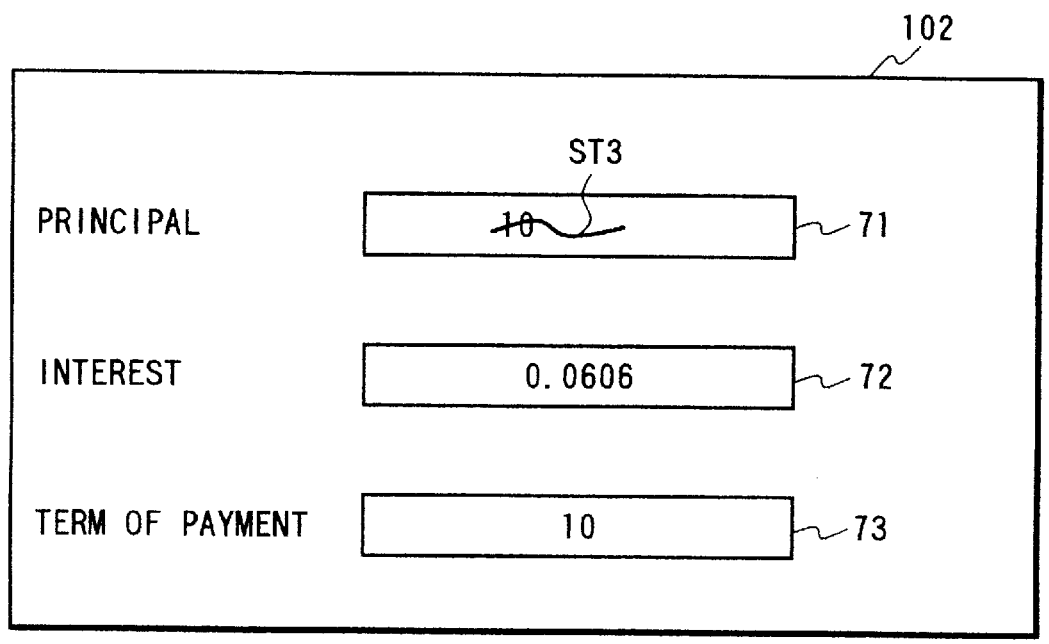
FIG. 10 is a diagram showing an example of an operation picture plane according to the third embodiment.
Figure 11:
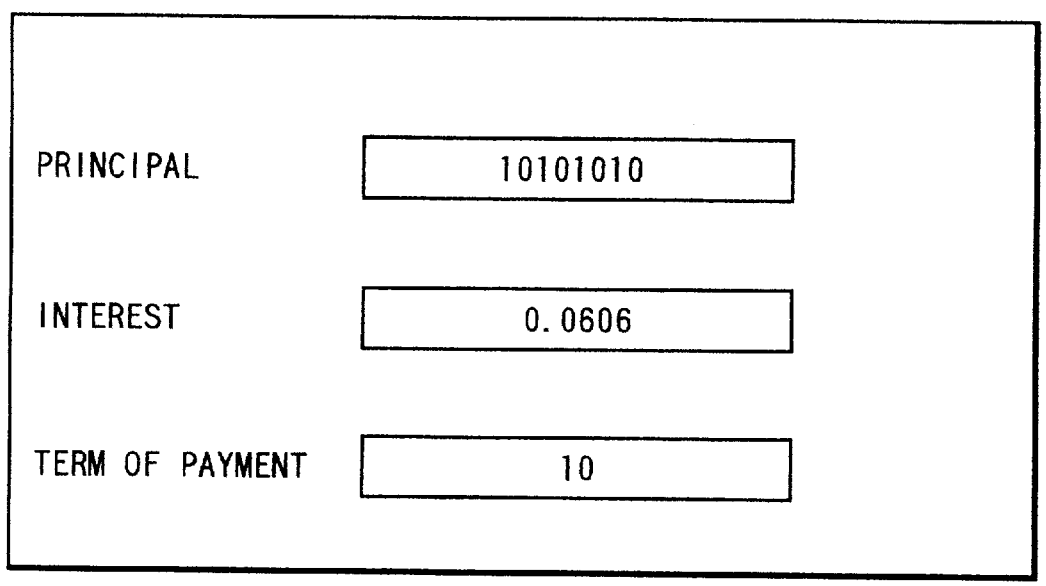
FIG. 11 is a diagram showing an example of an operation picture plane according to the third embodiment.

As for the component elements 1, 2, 3, 106, 6, and 7 in FIG. 9 are the same as those in the construction of FIG. 1, their descriptions are omitted. The recognition result memory 5 to store only one character recognition result in FIG. 1 is deleted and the process for storing the repetition characters and determining the number of repetition characters is executed by a repetition gesture recognizer 8. FIGS. 10 and 11 show examples of operation picture planes of the embodiment. Reference numerals 71, 72, and 73 in FIG. 10 denote numerical value input regions and ST3 indicates a character repetition gesture of a line-shaped stroke.

Figure 12:
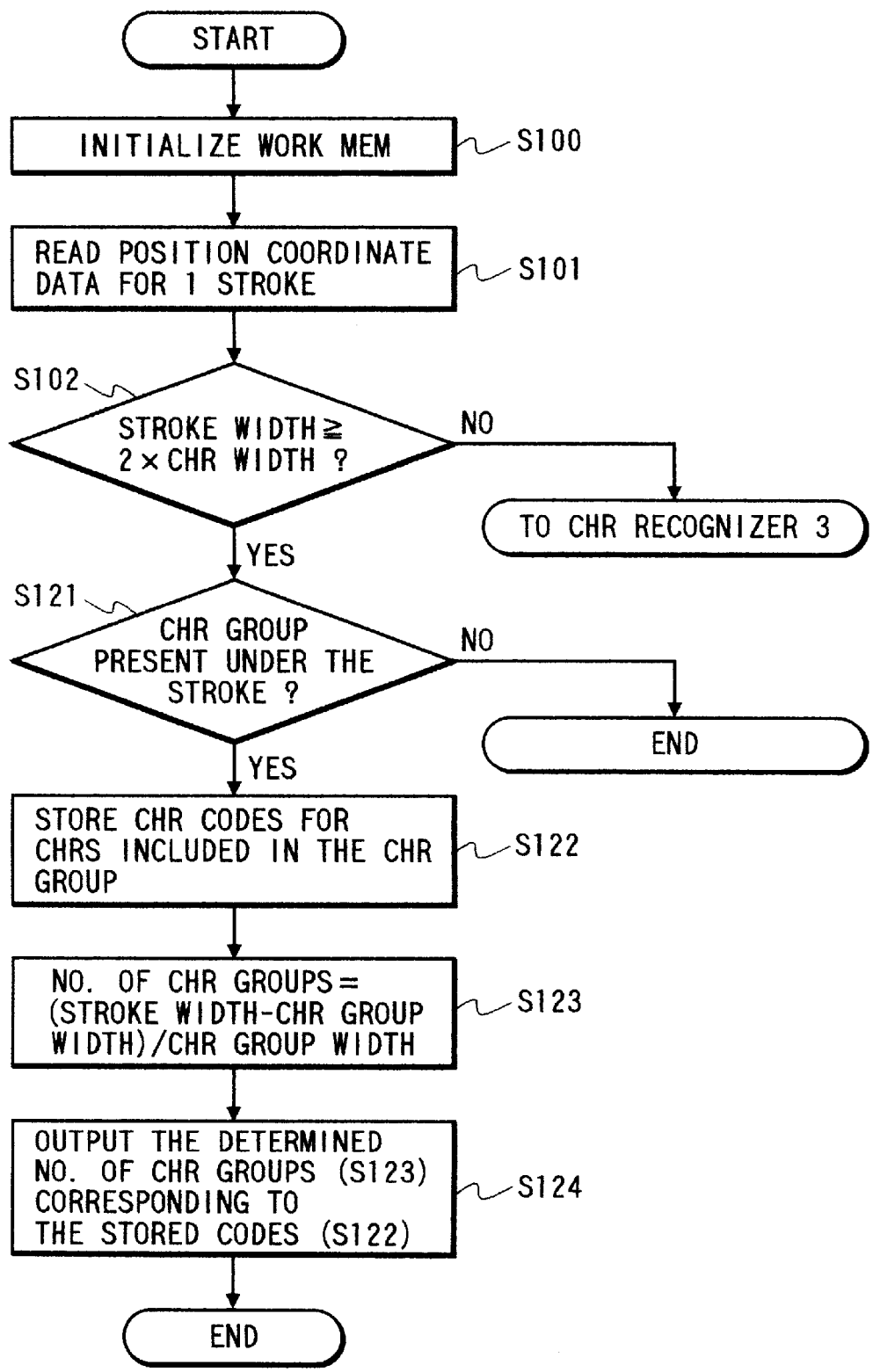
FIG. 12 is a flowchart showing processes of a repetition gesture recognizer 8 in the third embodiment.

FIG. 12 is a flowchart showing processes of the repetition gesture recognizer 8 in the embodiment. A program to realize such a flowchart has been stored in the memory 101. The processes will be explained with reference to the flowchart of FIG. 12. In steps S100, S101, and S102, processes similar to those described in the flowchart of FIG. 5 are executed. In the embodiment, when a length of line-shaped stroke is equal to or larger than two characters and a character exists under the stroke, the stroke is recognized as a character repetition gesture and the process is executed.

In step S101 a process for reading position coordinate data for one stroke into a work buffer is executed. In step S102, a length of stroke read in step S101 is checked. When the stroke width is equal to or larger than two characters, step S121 follows. When the stroke width is equal to one character, the stroke data is handed to the character recognizer 3.

In the example of FIG. 10, since the stroke written in the numerical value input area 71 has a width of two or more characters, it is a repetition gesture. Step S121 follows. In step S121, a check is made to see if a character exists under the stroke. When a character group exists under the stroke, since it is a repetition gesture, step S122 follows. When no character group exists under the stroke, since it is not a repetition gesture, the processing routine of this flowchart is finished.

When a size of character is equal to 16×16 dots, a state in which the stroke exists beyond the area of 16×16 dots serving as an area of the character assumes a state in which the character exists under the stroke. Since the stroke exists beyond "10" as shown in the input area 71 in FIG. 10, the processing routine advances to step S122.

In step S122, the character existing under the stroke is stored in the memory area as a character to be repetitively outputted. In the example of FIG. 10, since "10" exists under the stroke of the repetition gesture, "10" is stored. It will be obviously understood that there is no problem even if Kanji characters, alphanumerical characters, or symbols are used as characters to be stored.

In step S123, the number of outputting character groups of the repetition gesture is determined. The character groups of the number that is equal to the stroke width from the right end to the end point of the character groups under the stroke are outputted.

$$\{(\text{the maximum} \times \text{coordinate of the stroke}) - (\text{the maximum} \times \text{coordinate of the characters under the stroke})\}/(\text{the width of character group under the stroke}) = (\text{the repetition number})$$

In the example of FIG. 10, $$\{(\text{the coordinate of the end point of the stroke}) - (\text{the coordinate of the right end of a character of "0"})\}/(\text{the character group width of "10"}) = 3$$

Thus, the repetition number is equal to 3.

In step S124, the stored character groups of only the designated number of the character codes by setting the right end of the characters under the gesture stroke to the start point are outputted. In step S122, a process for outputting the stored character groups of only the number designated in step S123 is executed. In case of the example of FIG. 10, since "10" is stored in step S122 and the repetition number has been determined to be 3 in step S123, "101010" is outputted as shown in the example of FIG. 11. If the decided number is equal to 2.5 in step S123, since two character groups and the half character group which were stored are outputted, "10101" is outputted.

By executing the processes as mentioned above, in the case where the user wants to continuously input a plurality of same character groups, by inputting the repetition gesture of a length that the user wants to repeat, only the desired number of same character groups can be continuously easily inputted.

[Embodiment 4]

The fourth embodiment of the invention will now be described.

In the above third embodiment, in the process of the repetition gesture, the designation of the repetition character group and the determination of the repetition output number have been performed by one repetition gesture stroke. However, an embodiment in which they are realized by two gestures of a designated gesture of the repetition character group and the designated gesture of the repetition output number is also considered. In the embodiment, although the shape of stroke of the repetition gesture is set to the line shape, when characters exist under the stroke, a process to store the character group is executed as a designated gesture of the repetition character group. When no character exists under the stroke, the gesture is set to the repetition output number designated gesture and a process to output the character groups of the designated number is executed.

Figure 13:
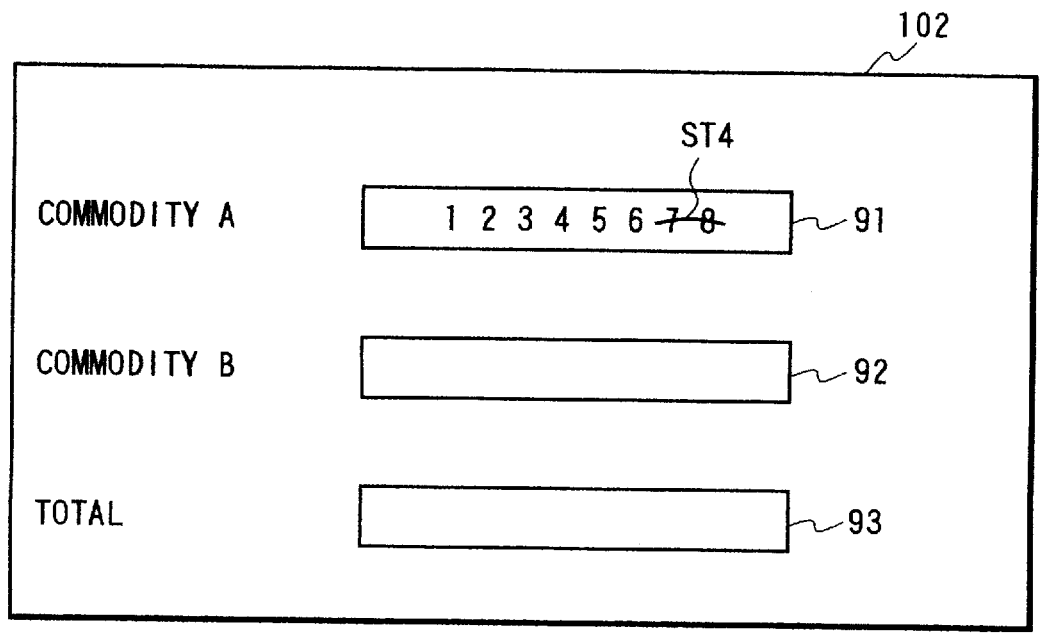
FIG. 13 is a diagram showing an example of an operation picture plane according to the fourth embodiment.
Figure 14:
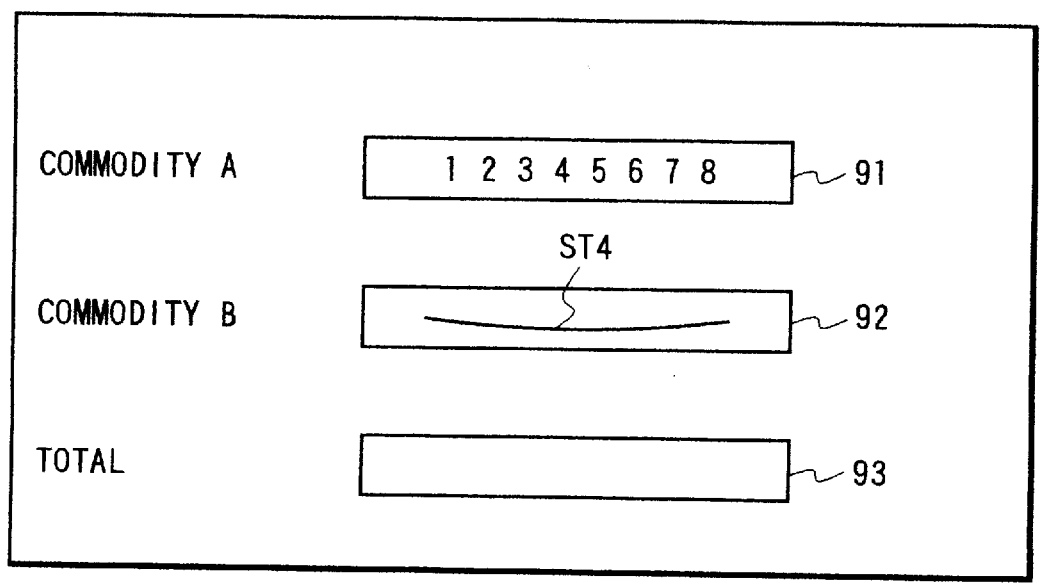
FIG. 14 is a diagram showing an example of an operation picture plane according to the fourth embodiment.
Figure 15:
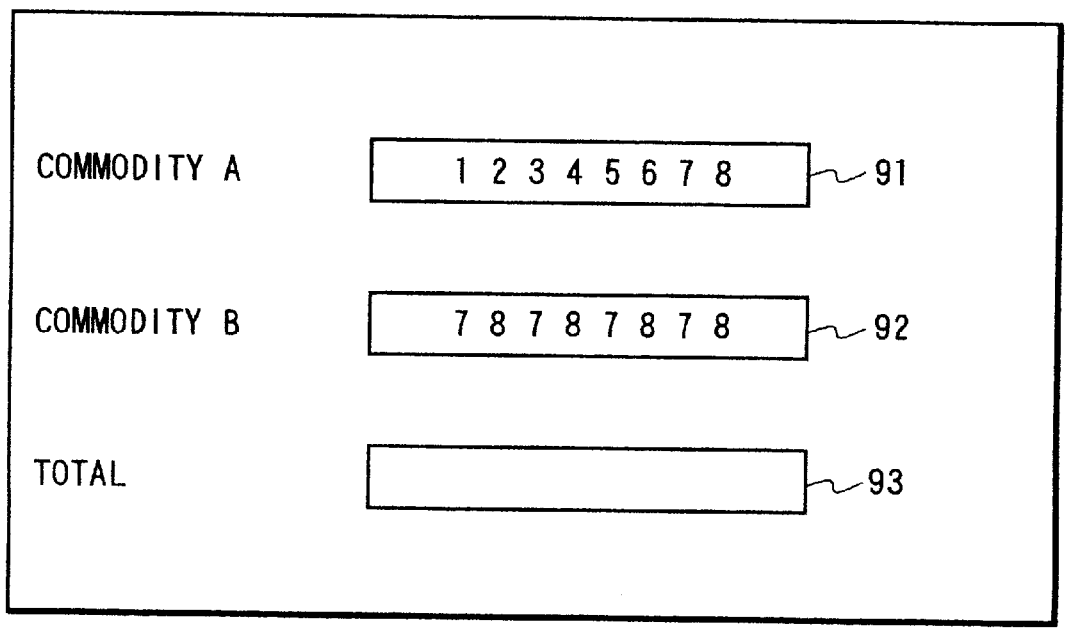
FIG. 15 is a diagram showing an example of an operation picture plane according to the fourth embodiment.

Since a construction of a main portion of the embodiment is similar to that in FIG. 9 of the third embodiment, its description is omitted. FIGS. 13, 14, and 15 show examples of operation picture planes in the embodiment. Reference numerals 91, 92, and 93 in FIG. 13 denote numerical value input areas and ST4 indicates a stroke.

Figure 16:
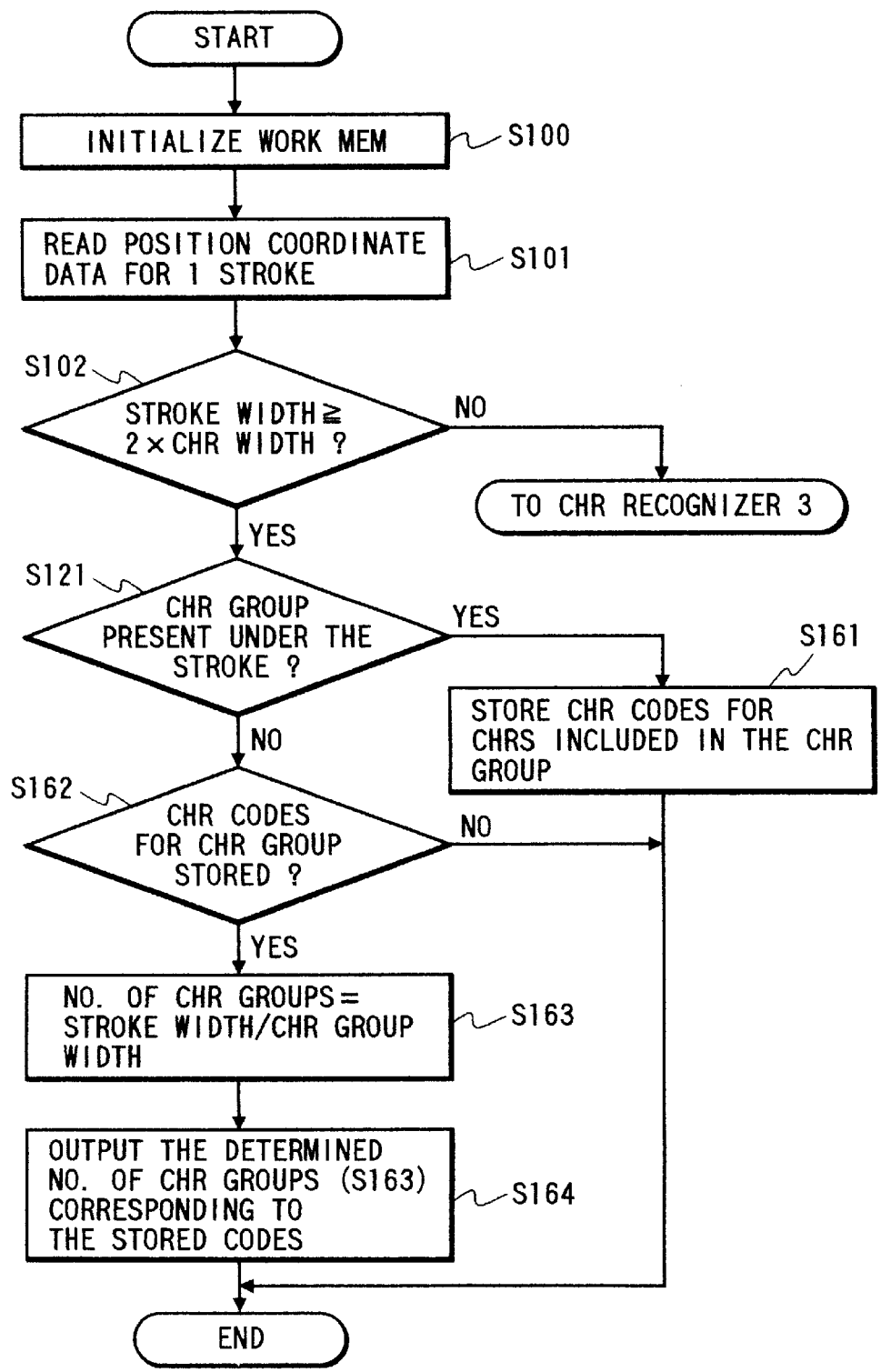
FIG. 16 is a flowchart showing processes of a repetition gesture recognizer 8 in the fourth embodiment.

FIG. 16 is a flowchart showing processes of the repetition gesture recognizer 8 in the fourth embodiment. A program to realize the flowchart has been stored in the memory 101. The processes will now be described with reference to the flowchart of FIG. 16.

In steps S100, S101, and S102, processes similar to those described in the flowchart of FIG. 5 are executed. A process for reading position coordinate data for one stroke into the work buffer is performed in step S101. In step S102, a length of stroke read in step S101 is discriminated. When the stroke width is equal to or larger than two characters, step S121 follows. When it is equal to one character, the stroke data is handed to the character recognizer 3. In the example of FIG. 13, since the stroke written in the numerical value input area 71 has a width of two or more characters, it is a repetition gesture. The processing routine advances to step S121.

In step S121, a check is made to see if a character group exists under the stroke in order to discriminate whether the stroke relates to a designated gesture of the repetition character group or the repetition output number designated gesture. When the characters exist under the stroke, the processing routine advances to a process in step S161. When no character exists under the stroke, a process in step S162 follows. In the example of FIG. 13, since a character group "7 8" exists under the stroke in the input area 91, the process in step S161 follows. In the example of FIG. 14, on the other hand, since no character exists under the stroke of the input area 92, step S162 follows.

In step S161, character codes of the character group existing under the stroke are stored into the memory area as a character group to be repetitively outputted. In the example of FIG. 13, since a character group "7 8" exists under the stroke of the input area 91, the character codes of "7 8" are stored. Or, it is also possible to construct in a manner such that a character group is selected by using a cursor key on the display 102 without using the gesture and is stored into a memory area of the character group to be repetitively outputted.

In step S162, a check is made to see if the character group has been stored in the memory area of the character group to be repetitively outputted. When the character group has been stored in the memory area of the character group to be repetitively outputted, step S163 follows. When the character group is not stored, the processing routine of the flowchart of the repetition gesture is finished.

When the operations shown in the operation example of FIG. 14 are executed after the operation example of FIG. 13, since the character group "7 8" has been stored in the memory area of the character group to be repetitively outputted in the example of FIG. 13, if a repetition output number designated gesture is written in FIG. 14, step S163 follows.

In step S163, a process to decide the repetition number of the character group to be outputted is executed. To repetitively display the character groups of the number corresponding to the width of repetition gesture, the repetition number is set as follows.

{the width of repetition gesture (the maximum×coordinate of the stroke−the minimum×coordinate)}/{the character group width (the width of character font designated at that time×the number of characters of the character group)}=repetition number It is also possible to construct in a manner such that when it is determined that the repetition gesture was inputted, if there are characters in a selecting state, those characters are repetitively outputted.

Figure 17:
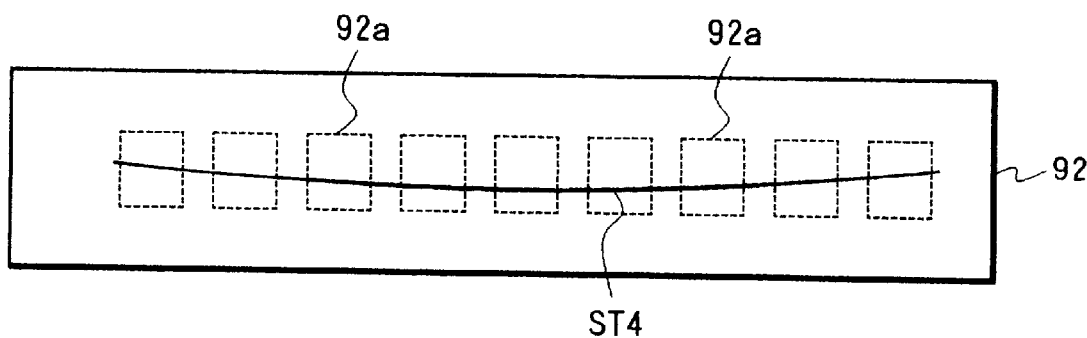
FIG. 17 is a diagram showing a virtual number display of output characters.

In the example of FIG. 14, the stroke width in the input area 92 is equal to eight characters and the character group stored in the example of FIG. 13 is equal to two characters, so that 8/2=4 and the repetition number is equal to 4. In the embodiment, the gesture stroke is inputted and the gesture recognizing process is executed at a time point when the pen is lifted up. However, a repetition gesture process which can be more easily used for the user can be provided by the following method. That is, each time a desired point is depressed by the pen and the position coordinate point is inputted, whether the input stroke is a gesture stroke or a character stroke is discriminated. When the stroke of the repetition output number designated gesture in the input area 92 in the example of FIG. 14 is written, the following calculation {(the present×coordinate)−(the×coordinate at the start point of the stroke)}/(the width of the character font)

is executed in a real-time manner, and a virtual number display (broken line frame in FIG. 17) 92a of the output characters is executed.

In step S164, a process for outputting the designated character group only the designated number of times while setting the left end of the repetition output number designated gesture to a start point is executed. In the example of FIG. 13, "7 8" is stored. In the example of FIG. 14, since the repetition output number designated gesture was inputted to the input area 92 and the number of output times was determined to be 4 in step S163, "78787878" is outputted and displayed in the input area 92 as shown in the example of FIG. 14.

By executing the processes as mentioned above, when the user wants to continuously input a plurality of same character groups to a remote location such as another row or the like, the designated gesture of the repetition character group is inputted on the character group in which the user wants to repetitively output and the repetition number designated gesture of a length in which the user wants to repeat is inputted at a location to be outputted. Thus, the only the desired number of same character groups can be also easily continuously inputted to the remote location.

The invention can be applied to a system constructed by a plurality of equipment or can be also applied to a handwriting character recognizing apparatus comprising one equipment. It will be obviously understood that the invention can be applied to a case where it is accomplished by supplying a program to a system or a handwriting character recognizing apparatus. In this case, by reading out a storage medium in which a program expressed by software to accomplish the present invention has been stored and transmitting the read-out program to the system or handwriting character recognizing apparatus, the system or handwriting character recognizing apparatus can receive the effects of the invention.

What is claimed is:

1. An image processing method comprising the steps of:
inputting an image having a predetermined shape, the image being input with a width corresponding to a repetition number of a specified character for repetitively outputting;
dividing the width of the input image by a width of said specified character, and determining the repetition number of said specified character based on the resulting quotient; and repetitively outputting said specified character the determined repetition number of times to a position corresponding to said input image.

2. A method according to claim 1, wherein said input image is a handwriting stroke.

3. A method according to claim 1, wherein when said input image has the predetermined shape, the step of determining said repetition number of said specified character is executed.

4. A method according claim 1, wherein the character font for said specified character is designated.

5. A method according to claim 1, wherein said specified character is a figure.

6. A method according to claim 1, wherein said specified character is a handwriting character pattern.

7. A method according to claim 1, wherein said specified character is an image inputted just before said input image is inputted.

8. A method according to claim 1, wherein said specified character is a character code derived by being recognized just before said input image is inputted.

9. A method according to claim 1, wherein said specified character is an image adjacent to said input image.

10. A method according to claim 1, wherein said specified character is an image outputted under said input image.

11. A method according to claim 1, wherein said specified character is an image selected before said input image is inputted.

12. A method according to claim 1, wherein said specified character is an image specified as a repetition image before said input image is inputted.

13. A method according to claim 1, wherein the output of said character is performed in accordance with a format in which said specified image is displayed.

14. A method according to claim 1, wherein said input image is inputted as coordinate information.

15. An image processing apparatus comprising:

input means for inputting an image having a predetermined shape, where the image is input with a width corresponding to a repetition number of a specified character for repetitively outputting;

repetition number deriving means for dividing the width of the input image by the width of the specified character, and determining the repetition number of said specified character based on the resulting quotient; and output means for repetitively outputting said specified character said determined number of times to a position corresponding to said input image.

16. An apparatus according to claim 15, wherein said input image is a handwriting stroke.

17. An apparatus according to claim 15, further having discriminating means for discriminating whether the shape of the input image is the predetermined shape or not, and wherein said repetition number deriving means derives said repetition number of said character when it is determined that the input image has said predetermined shape.

18. An apparatus according to claim 15, wherein the character font for said specified character is designated.

19. An apparatus according to claim 15, wherein said specified character is a figure.

20. An apparatus according to claim 15, wherein said specified character is a handwriting character pattern.

21. An apparatus according to claim 15, wherein said specified character is an image inputted just before said input image is inputted.

22. An apparatus according to claim 15, wherein said specified character is a character code derived by being recognized just before said input image is inputted.

23. An apparatus according to claim 15, wherein said specified character is an image adjacent to said input image.

24. An apparatus according to claim 15, wherein said specified character is an image outputted under said input image.

25. An apparatus according to claim 15, wherein said specified character is an image selected before said input image is inputted.

26. An apparatus according to claim 15, wherein said specified character is an image specified as a repetition image before said input image is inputted.

27. An apparatus according to claim 15, wherein said output means outputs the image in accordance with a format in which said specified character is displayed.

28. An apparatus according to claim 15, further having coordinate information input means for inputting said input image as coordinate information.

29. A computer-readable memory medium storing program codes for causing execution of an image processing method that comprises the steps of:

inputting an image having a predetermined shape, the image being input with a width corresponding to a repetition number of a specified character for repetitively outputting;

dividing the width of the input image by a width of said specified character, and determining the repetition number of said specified character based on the resulting quotient; and repetitively outputting said specified character the determined repetition number of times to a position corresponding to said input image.

30. A memory medium according to claim 29, wherein said input image is a handwriting stroke.

31. A memory medium according to claim 29, wherein when said input image has the predetermined shape, the step of determining said repetition number of said specified character is executed.

32. A memory medium according to claim 29, wherein the character font for said specified character is designated.

33. A memory medium according to claim 29, wherein said specified character is a figure.

34. A memory medium according to claim 29, wherein said specific character is a handwriting character pattern.

35. A memory medium according to claim 29, wherein said specific character is an image inputted just before said input image is inputted.

36. A memory medium according to claim 29, wherein said specific character is a character code derived by being recognized just before said input image is inputted.

37. A memory medium according to claim 29, wherein said specified character is an image adjacent to said input image.

38. A memory medium according to claim 29, wherein said specified character is an image outputted under said input image.

39. A memory medium according to claim 29, wherein said specified character is an image selected before said input image is inputted.

40. A memory medium according to claim 29, wherein said specified character is an image specified as a repetition image before said input image is inputted.

41. A memory medium according to claim 29, wherein the output of said image is performed in accordance with a format in which said specified character is displayed.

42. A memory medium according to claim 29, wherein said input image is inputted as coordinate information.

* * * * *

UNITED STATES PATENT AND TRADEMARK OFFICE
CERTIFICATE OF CORRECTION

PATENT NO. : 6,282,316 B1
DATED : August 28, 2001
INVENTOR(S) : Tsunekazu Arai

It is certified that error appears in the above-identified patent and that said Letters Patent is hereby corrected as shown below:

<u>Title page,</u>
Item [56], References Cited - U.S. PATENT DOCUMENTS: insert:

-- 5,428,805 * 6/1995 Morgan --

Item [56], References Cited - FOREIGN PATENT DOCUMENTS: insert:

-- 0597379  5/94   EPO
0598402  11/93  EPO --.

Item [57], ABSTRACT,
Line 1, "a void" should read -- avoid --.

<u>Column 3,</u>
Line 29, "herein later," should read -- hereinbelow, --; and
Line 40, "be also" should read -- also be --.

<u>Column 4,</u>
Line 56, "be also" should read -- also be --; and
Line 60, "be also" should read -- also be --.

<u>Column 5,</u>
Line 27, "be also" should read -- also be --;
Line 28, "be also" should read -- also be --; and
Line 43, "be also" should read -- aslo be --.

UNITED STATES PATENT AND TRADEMARK OFFICE
CERTIFICATE OF CORRECTION

PATENT NO. : 6,282,316 B1
DATED : August 28, 2001
INVENTOR(S) : Tsunekazu Arai

It is certified that error appears in the above-identified patent and that said Letters Patent is hereby corrected as shown below:

<u>Column 10,</u>
Line 23, "presentxcoordinate" should read -- present Xcoordinate -- and "thexcoordinate" should read -- the Xcoordinate --;
Line 45, "the" (first occurrence) should be deleted; and
Line 46, "be also" should read -- also be --.

Signed and Sealed this

Eleventh Day of June, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.    : 6,282,316 B1
DATED         : August 28, 2001
INVENTOR(S)   : Tsunekazu Arai It is certified that error appears in the above-identified patent and that said Letters Patent is hereby corrected as shown below:

<u>Title page,</u>
Item [56], References Cited, U.S. PATENT DOCUMENTS, insert
-- 5,428,805 * 6/1995 Morgan --.
Item [56], References Cited, FOREIGN PATENT DOCUMENTS,
-- 0597379   5/94   EPO
   0598402   11/93   EPO --.
Item [57], ABSTRACT,
Line 1, "a void" should read -- avoid --.

<u>Column 3,</u>
Line 29, "herein later," should read -- hereinbelow, --; and
Line 40, "be also" should read -- also be --.

<u>Column 4,</u>
Lines 56 and 60, "be also" should read -- also be --.

<u>Column 5,</u>
Lines 27, 28 and 43, "be also" should read -- also be --.

<u>Column 10,</u>
Line 23, "presentxcoordinate" should read -- present Xcoordinate -- and "thexcoordinate" should read -- the Xcoordinate --;
Line 45, "the" (first occurrence) should be deleted; and
Line 46, "be also" should read -- also be --.

UNITED STATES PATENT AND TRADEMARK OFFICE
CERTIFICATE OF CORRECTION

PATENT NO. : 6,282,316 B1
DATED : August 28, 2001
INVENTOR(S) : Tsunekazu Arai

It is certified that error appears in the above-identified patent and that said Letters Patent is hereby corrected as shown below:

<u>Column 11,</u>
Line 32, "character" should read -- image --; and
Line 33, "image" should read -- character --.

This certificate supercedes Certificate of Correction issued June 11, 2002

Signed and Sealed this

Twenty-fourth Day of December, 2002

JAMES E. ROGAN
*Director of the United States Patent and Trademark Office*